(12) United States Patent
Delp

(10) Patent No.: US 9,278,689 B1
(45) Date of Patent: Mar. 8, 2016

(54) AUTONOMOUS VEHICLE DETECTION OF AND RESPONSE TO EMERGENCY VEHICLES

(71) Applicant: Toyota Motor Engineering & Manufacturing North America, Inc., Erlanger, KY (US)

(72) Inventor: Michael J. Delp, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/541,056

(22) Filed: Nov. 13, 2014

(51) Int. Cl.
*B60W 30/00* (2006.01)
*B60Q 1/34* (2006.01)
*G05D 1/00* (2006.01)
*G06F 3/16* (2006.01)

(52) U.S. Cl.
CPC ............... *B60W 30/00* (2013.01); *B60Q 1/346* (2013.01); *G05D 1/0027* (2013.01); *G06F 3/167* (2013.01)

(58) Field of Classification Search
CPC .... G08G 1/166; B60H 1/00771; B60Q 1/346; B60T 2201/022; B60T 2201/08
USPC ......... 701/23, 25, 41, 301; 348/148; 340/903; 382/104
See application file for complete search history.

(56) References Cited

U.S. PATENT DOCUMENTS

2002/0022927 A1* 2/2002 Lemelson ............... G01S 19/11
701/301

2007/0132608 A1* 6/2007 Votaw .................. G08G 1/0965
340/903

(Continued)

FOREIGN PATENT DOCUMENTS

JP      20020245588 A    8/2002
JP      2005316889 A    11/2005

(Continued)

OTHER PUBLICATIONS

Urmson; Robotics Science and Systems, Realizing Self-Driving Cars; Google Presentation; Jul. 14, 2014; 3 pages.

*Primary Examiner* — Jerrah Edwards
*Assistant Examiner* — Sanjeev Malhotra
(74) *Attorney, Agent, or Firm* — Christopher G. Darrow; Darrow Mustafa PC (57) ABSTRACT

An automated driving system and methods are disclosed. The automated driving system includes a perception system disposed on an autonomous vehicle. The automated driving system can detect, based on an audio recording captured by the perception system, an emergency vehicle operating in an emergency mode. After detection, an image of the environment surrounding the autonomous vehicle can be captured by the perception system. Based on at least one of the audio recording and the image of the environment surrounding the autonomous vehicle, a location of the emergency vehicle in respect to the autonomous vehicle can be determined. If the location of the emergency vehicle is such that the autonomous vehicle is required to comply with a traffic regulation, the automated driving system can send a command to one or more vehicle systems of the autonomous vehicle to implement one or more maneuvers to comply with the traffic regulation.

18 Claims, 6 Drawing Sheets

(56) References Cited

U.S. PATENT DOCUMENTS

| | | | |
|---|---|---|---|
| 2012/0310465 A1* | 12/2012 | Boatright | B60Q 1/346 701/25 |
| 2013/0141578 A1* | 6/2013 | Chundrlik, Jr. | H04N 7/181 348/148 |
| 2014/0071280 A1* | 3/2014 | Baalu | G06F 3/167 348/148 |
| 2014/0142799 A1 | 5/2014 | Ferguson et al. | |
| 2014/0358353 A1* | 12/2014 | Ibanez-Guzman | G05D 1/0027 701/23 |
| 2015/0161458 A1* | 6/2015 | Agnew | G06K 9/00825 382/104 |
| 2015/0166062 A1* | 6/2015 | Johnson | B60W 30/12 701/41 |
| 2015/0185732 A1* | 7/2015 | Debouk | G05D 1/0055 701/23 |

FOREIGN PATENT DOCUMENTS

| | | |
|---|---|---|
| JP | 2008052341 A | 3/2008 |
| JP | 2010067165 A | 3/2010 |
| JP | 2010237792 A | 10/2010 |

* cited by examiner

AUTONOMOUS VEHICLE DETECTION OF AND RESPONSE TO EMERGENCY VEHICLES

BACKGROUND

Fully or highly automated driving systems are designed to operate a vehicle on the road without driver interaction or other external control, for example, self-driving vehicles or autonomous vehicles. As part of safe operation in the autonomous mode, some autonomous vehicles are configured to detect nearby emergency vehicles within one or more images captured by a perception system. Other autonomous vehicles can infer that an emergency vehicle is nearby based on the behavior of surrounding vehicles responding to the emergency vehicle. However, the aforementioned examples of detection and response to an emergency vehicle are not sufficient in the case of an obstructed view of the emergency vehicle from the vantage point of the perception system of the autonomous vehicle or the lack of other vehicles surrounding the emergency vehicle.

SUMMARY

Methods and systems for automated driving in the presence of emergency vehicles are described below. An automated driving system can detect, based on images, audio recordings, or both, an emergency vehicle within the environment surrounding the autonomous vehicle. If the emergency vehicle is operating in an emergency mode, that is, sounding its siren or flashing, blinking, and/or rotating its lights, the autonomous vehicle can determine the location of the emergency vehicle and whether the location requires compliance with a traffic regulation. If the location does require compliance, for example, the emergency vehicle is sufficiently proximate to the autonomous vehicle, the automated driving system can send a command to one or more vehicle systems, such as the steering system and/or the braking system, to comply with the traffic regulation.

In one implementation, an automated driving system is disclosed. The automated driving system includes a perception system disposed on an autonomous vehicle and a computing device in communication with the perception system. The computing device includes one or more processors for controlling operations of the computing device and a memory for storing data and program instructions used by the one or more processors. The one or more processors are configured to execute instructions stored in the memory to: detect, based on an audio recording captured by the perception system, an emergency vehicle operating in an emergency mode; after detection, capture, using the perception system, an image of an environment surrounding the autonomous vehicle; determine, based on at least one of the audio recording and the image of the environment surrounding the autonomous vehicle, a location of the emergency vehicle in respect to the autonomous vehicle; and if the location of the emergency vehicle is such that the autonomous vehicle is required to comply with a traffic regulation, send a command to one or more vehicle systems of the autonomous vehicle to implement one or more maneuvers to comply with the traffic regulation.

In another implementation, a computer-implemented method of automated driving is disclosed. The method includes detecting, based on an image captured by a perception system disposed on an autonomous vehicle, an emergency vehicle; after detecting the emergency vehicle, determining, based on an audio recording captured by the perception system, whether the emergency vehicle is operating in an emergency mode; if the emergency vehicle is operating in the emergency mode, determining, based on at least one of the audio recording and the image, a location of the emergency vehicle in respect to the autonomous vehicle; and if the location of the emergency vehicle is such that the autonomous vehicle is required to comply with a traffic regulation, sending a command to one or more vehicle systems of the autonomous vehicle to implement one or more maneuvers to comply with the traffic regulation.

In another implementation, a computing device is disclosed. The computing device includes one or more processors for controlling operations of the computing device and a memory for storing data and program instructions used by the one or more processors. The one or more processors are configured to execute instructions stored in the memory to: determine, using a perception system disposed on an autonomous vehicle, a location of an emergency vehicle operating in an emergency mode; and if the location of the emergency vehicle is such that the autonomous vehicle is required to comply with a traffic regulation, send a command to one or more vehicle systems of the autonomous vehicle to implement one or more maneuvers to comply with the traffic regulation.

BRIEF DESCRIPTION OF THE DRAWINGS

The description herein makes reference to the accompanying drawings wherein like reference numerals refer to like parts throughout the several views, and wherein.

DETAILED DESCRIPTION

An automated driving system for an autonomous vehicle is disclosed. The automated driving system includes a perception system with various sensors configured to capture both audio recordings and images from the environment surrounding the autonomous vehicle. The automated driving system is configured to detect an emergency vehicle operating in an emergency mode within the audio recordings and images, either through sound matching of sirens within the audio recordings or shape matching, text matching, or light pattern matching within the images. The automated driving system is also configured to determine the location of the emergency vehicle in respect to the autonomous vehicle, and based on that location, determine whether the autonomous vehicle must comply with one or more traffic regulations, such as pulling over to the side of the road. Example locations requiring compliance include when the emergency vehicle's trajectory will cross the autonomous vehicle's planned vehicle path and when the emergency vehicle is sufficiently proximate to the autonomous vehicle.

Figure 1:
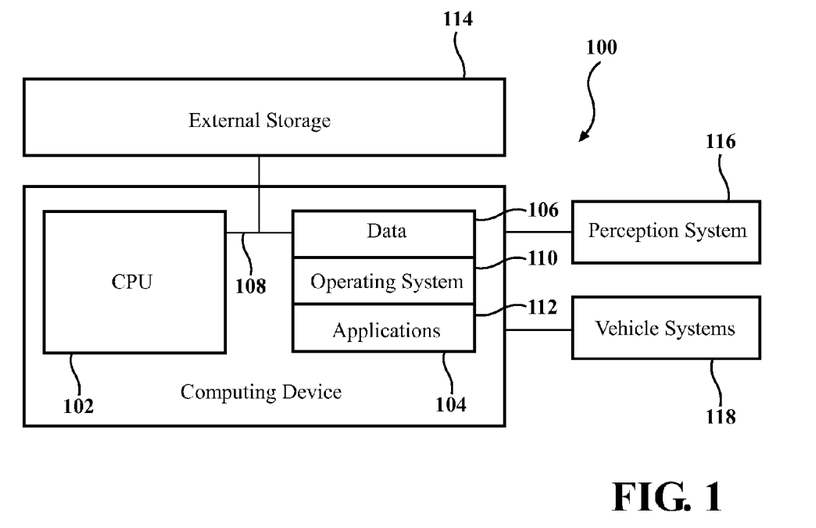
FIG. 1 is a block diagram of a computing device.

FIG. 1 is a block diagram of a computing device 100, for example, for use with an autonomous driving system. The computing device 100 can be any type of vehicle-installed, handheld, desktop, or other form of single computing device, or can be composed of multiple computing devices. The processing unit in the computing device can be a conventional central processing unit (CPU) 102 or any other type of device, or multiple devices, capable of manipulating or processing information. A memory 104 in the computing device can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to perform the automated driving methods described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device 100 can also be in communication with a perception system 116. The perception system 116 can be configured to capture data and/or signals for processing by an inertial measurement unit (IMU), a dead-reckoning system, a global navigation satellite system (GNSS), a light detection and ranging (LIDAR) system, a radar system, a sonar system, an image-based sensor system, a sound-based sensor system, or any other type of system capable of capturing information specific to the environment surrounding a vehicle. Information specific to the environment surrounding a vehicle can include information specific to objects such as other vehicles proximate to a planned vehicle path, pedestrians, obstacles, features of the planned vehicle path being traveled by the vehicle, or any other localized position data and/or signals that can be captured and sent to the CPU 102.

In the examples described below, the perception system 116 can be configured to capture, at least, images for an image-based sensor system and audio recordings for a sound-based sensor system such that the computing device 100 can detect the presence and proximity of other vehicles including emergency vehicles and determine the status of and distance from such other vehicles. The computing device 100 can also be in communication with one or more vehicle systems 118, such as a vehicle braking system, a vehicle propulsion system, a vehicle steering system, etc. The vehicle systems 118 can also be in communication with the perception system 116, the perception system 116 being configured to capture data indicative of performance of the various vehicle systems 118.

Figure 2:
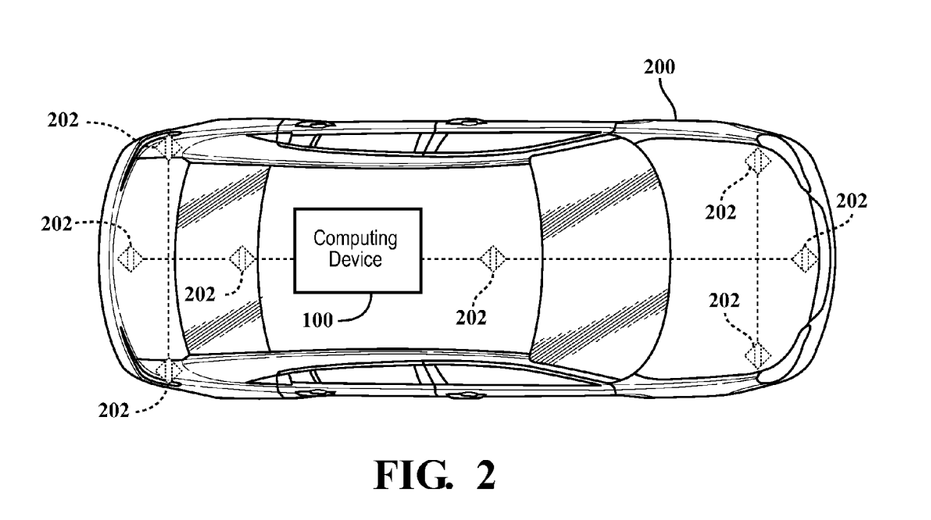
FIG. 2 is a schematic illustration of an autonomous vehicle including the computing device of FIG. 1.

FIG. 2 is a schematic illustration of an autonomous vehicle 200 including the computing device 100 of FIG. 1. The computing device 100 can be located within the autonomous vehicle 200 as shown in FIG. 2 or can be located remotely from the autonomous vehicle 200 in an alternate location (not shown). If the computing device 100 is located remotely from the autonomous vehicle 200, the autonomous vehicle 200 can include the capability of communicating with the computing device 100.

The autonomous vehicle 200 can also include a plurality of sensors 202, the sensors 202 being part of the perception system 116 described in reference to FIG. 1. One or more of the sensors 202 shown can be configured to capture images for processing by an image sensor, audio recordings for processing by a sound sensor, vehicle position in global coordinates based on signals from a plurality of satellites, the distance to objects within the surrounding environment for use by the computing device 100 to estimate position and orientation of the autonomous vehicle 200, or any other data and/or signals that could be used to determine the current state of the autonomous vehicle 200, determine the current state of surrounding vehicles, or determine the position of the autonomous vehicle 200 in respect to its environment including any surrounding vehicles.

Figure 3:
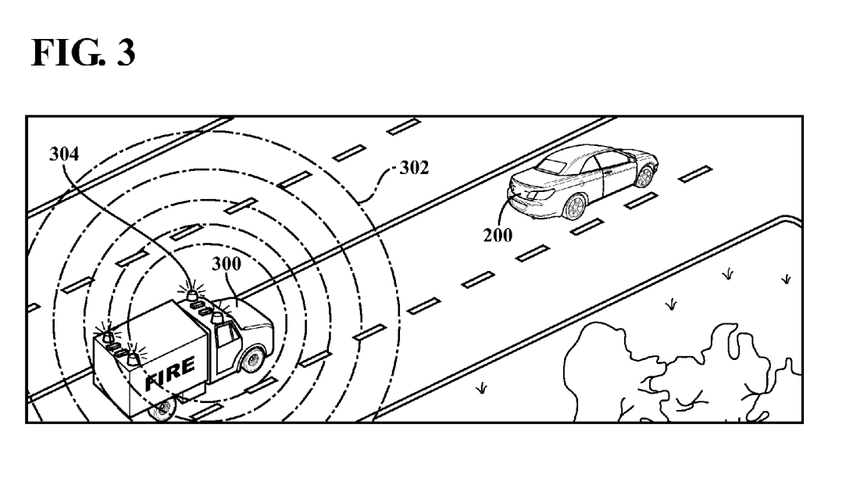
FIG. 3 shows the autonomous vehicle of FIG. 2 traversing a portion of an example planned vehicle path while being approached by an example emergency vehicle.

FIG. 3 shows the autonomous vehicle 200 of FIG. 2 traversing a portion of an example planned vehicle path while being approached from behind by an example emergency vehicle 300. The emergency vehicle 300 in this example is emitting sound waves 302 from a siren (siren not shown) and is blinking, rotating, and/or flashing one or more lights 304. The sound waves 302 and the blinking, rotating, and/or flashing lights 304 can be implemented using well recognized patterns associated with the emergency vehicle 300 operating in an emergency mode. When the emergency vehicle 300 is operating in the emergency mode, traffic proximate to the emergency vehicle 300, including the autonomous vehicle 200 in this example, is required to comply with one or more safety-based traffic regulations.

One example traffic regulation related to an emergency mode can include that the autonomous vehicle 200 must slow down and pull over to the right side of a roadway clear of an intersection while traveling its current planned vehicle path if the emergency vehicle 300 sounds its siren and/or flashes, blinks, or rotates its lights 304 while traveling in a location in relation to the autonomous vehicle 200 that requires compliance with the traffic regulation. FIG. 3 shows an example location of the emergency vehicle 300 in reference to the autonomous vehicle 200 that requires compliance with this example traffic regulation, namely, the emergency vehicle 300 is approaching the autonomous vehicle 200 from behind and traveling in the same direction as the autonomous vehicle 200 in a neighboring lane.

Given that the location of the emergency vehicle 300 is such that the autonomous vehicle 200 must comply with the traffic regulation, the autonomous vehicle 200 can determine when the emergency vehicle 300 becomes sufficiently proximate before pulling over to the right side of the road. Determining the proximity of the emergency vehicle 300 can include detecting the emergency vehicle 300, determining the location of the emergency vehicle 300, and measuring the distance between in the autonomous vehicle 200 and the emergency vehicle 300. Various methods of detection, location determination, and distance measurement using audio recordings and captured images are described in additional examples below.

Figure 4:
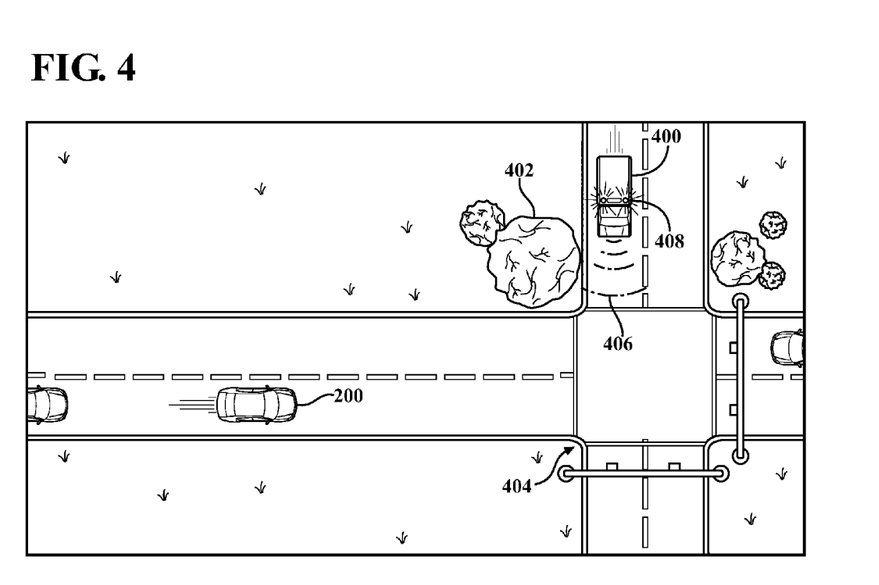
FIG. 4 shows the autonomous vehicle of FIG. 2 traversing a portion of another example planned vehicle path while approaching another example emergency vehicle obstructed from view by foliage at an intersection.

FIG. 4 shows the autonomous vehicle 200 of FIG. 2 traversing a portion of another example planned vehicle path while approaching another example emergency vehicle 400 obstructed from view by foliage 402 at an intersection 404. The emergency vehicle 400 in this example is also emitting sound waves 406 from a siren and is blinking, rotating, and/or flashing one or more lights 408. Since the foliage 402 blocks image-based detection of the emergency vehicle 400 by the autonomous vehicle 200, initial detection of the emergency vehicle 400 can be based on an audio recording captured by the perception system 116. To detect the emergency vehicle 400 using an audio recording, the computing device 100 can include an application 112 configured to match a sound-pattern of the sound waves 406 emitted by the siren of the emergency vehicle 400 to a library of sound patterns associated with emergency vehicles.

Once the emergency vehicle 400 is detected using the audio recording, the location of the emergency vehicle 400 can be determined, for example, using a second audio recording captured by a sensor 202 disposed at a different location on the autonomous vehicle 200 than the sensor 202 used to capture the initial audio recording. The two sensors 202 can be a pair of microphones disposed at different ends of the autonomous vehicle 200 as shown in FIG. 2. The audio recordings captured at the two different positions on the autonomous vehicle 200 can be compared, for example, using the difference in time of arrival of the sound waves 406, to determine the location of the emergency vehicle 400 in respect to the autonomous vehicle 200. If the location of the emergency vehicle 400 is such that the autonomous vehicle is required to comply with a traffic regulation, as in this example where both the autonomous vehicle 200 and the emergency vehicle 400 are approaching the same intersection 404, the computing device 100 can send a command to one or more vehicle systems 118 to implement one or more maneuvers, such as steering or braking, to comply with the traffic regulation.

In addition to determining the location of the emergency vehicle 400 in respect to the autonomous vehicle, the computing device 100 can be configured to calculate the distance between the autonomous vehicle 200 and the emergency vehicle 400. In the example of FIG. 4, the distance between the emergency vehicle 400 and the autonomous vehicle 200 can be estimated based on the decibel level of the sound waves 406 captured by the sensors 202 disposed on the autonomous vehicle 200. For example, both the speed and direction of travel of the emergency vehicle 400 can be estimated based on a Doppler effect, that is, a higher frequency siren can indicate that the emergency vehicle 400 is approaching the autonomous vehicle 200.

Whether the autonomous vehicle 200 is required to comply with the traffic regulation can also be based on the distance between the autonomous vehicle 200 and the emergency vehicle 400 being below a predetermined threshold. If the distance between the autonomous vehicle 200 and the emergency vehicle 400 is below the predetermined threshold, e.g. 400$m$, the autonomous vehicle 200 can send a command to various vehicle systems 118 to implement the necessary maneuvers to comply with the traffic regulation. A predetermined threshold of 400 m is just an example, and the predetermined threshold can be based on both the type of traffic regulation being complied with and the jurisdiction where the autonomous vehicle 200 is operating.

Alternatively, if the distance between the autonomous vehicle 200 and the emergency vehicle 400 is above the predetermined threshold, the autonomous vehicle 200 can continue its planned vehicle path until the distance falls below the predetermined threshold, at which point the autonomous vehicle 200 can be configured to comply with the given traffic regulation. Waiting to comply until the distance between the autonomous vehicle 200 and the emergency vehicle 400 is below a predetermined threshold is consistent with manually driven vehicle behavior in the presence of emergency vehicles. If the autonomous vehicle 200 complies too soon (or too late) it could disrupt traffic patterns and potentially impede the progress of the emergency vehicle 400 further instead of allowing the emergency vehicle 400 to safely pass through the intersection 404.

Figure 5:
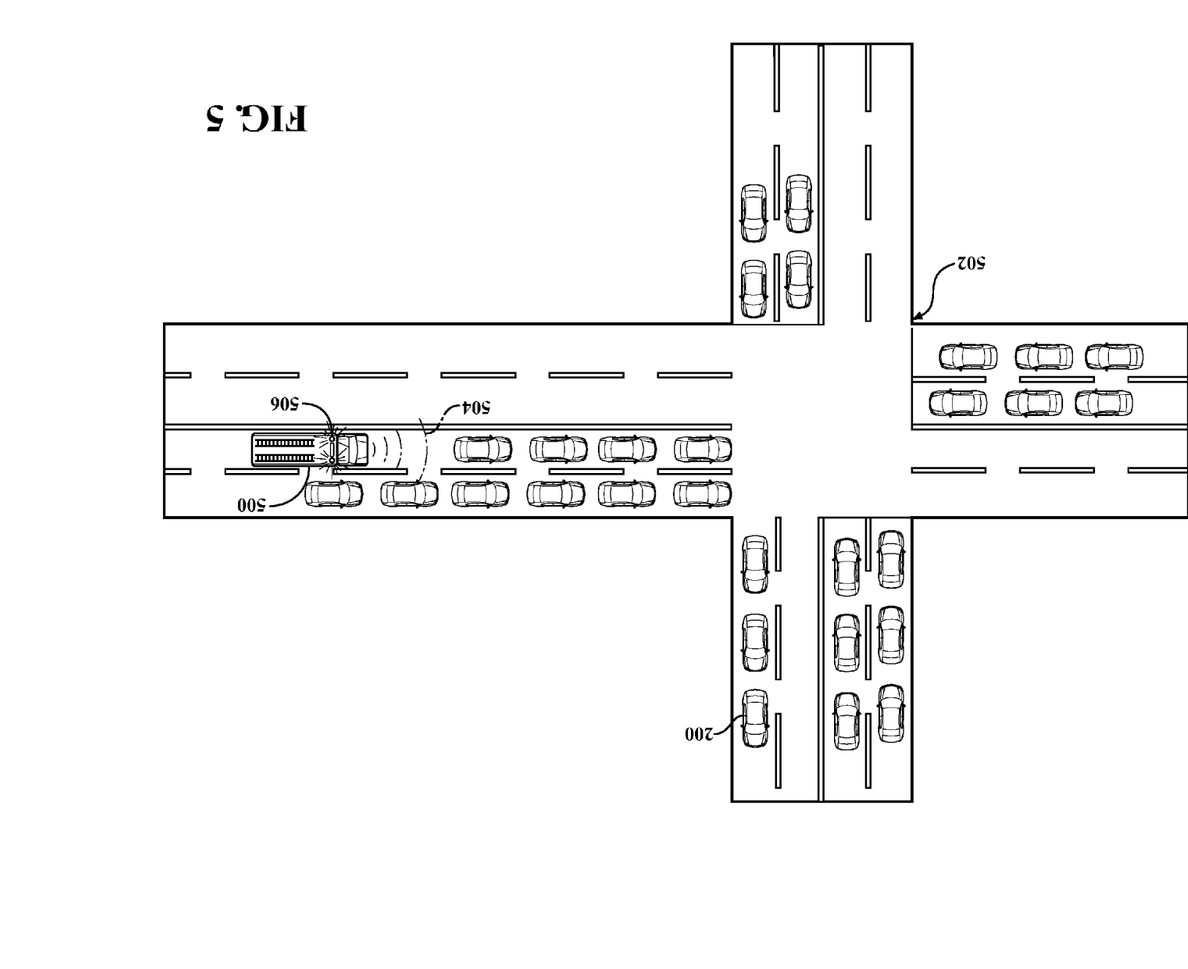
FIG. 5 shows the autonomous vehicle of FIG. 2 traversing a portion of another example planned vehicle path while traveling away from another example emergency vehicle potentially obstructed from view by surrounding vehicles at an intersection.

FIG. 5 shows the autonomous vehicle 200 of FIG. 2 traversing a portion of another example planned vehicle path while traveling away from another example emergency vehicle 500 potentially obstructed from view by surrounding vehicles at an intersection 502. The emergency vehicle 500 in this example is also operating in an emergency mode as the emergency vehicle 500 is emitting sound waves 504 from a siren and is blinking, rotating, and/or flashing one or more lights 506. In this example, the autonomous vehicle 200 is leaving the intersection 502 being approached by the emergency vehicle 500, and there are several surrounding vehicles between the autonomous vehicle 200 and the emergency vehicle 500. Depending on the size and placement of the surrounding vehicles, initial detection of the emergency vehicle 500 can occur in different ways.

In one example, if the surrounding vehicles do not block the view of the emergency vehicle 500 from the autonomous vehicle 200, detection of the emergency vehicle 500 can be based on at least one of shape matching, text matching, and light pattern matching within the image of the emergency vehicle 500 captured by the perception system 116. After the emergency vehicle 500 is detected, the perception system 116 can be configured to capture an audio recording to determine whether the emergency vehicle 500 is operating in an emergency mode, i.e. whether a siren associated with the emergency vehicle 500 is detected within the audio recording. In another example, if the surrounding vehicles do initially block the view of the emergency vehicle 400 from the autonomous vehicle 200, detection of the emergency vehicle 500 can be based on sound matching of a siren associated with the emergency vehicle 500 within an audio recording captured by the perception system 116.

Depending on the method of detection of the emergency vehicle 500 and whether the view of the emergency vehicle 500 from the autonomous vehicle 200 becomes subsequently obstructed or unobstructed, the location of the emergency vehicle 500 in respect to the autonomous vehicle 200 can be determined. In one example where the view is unobstructed after the emergency vehicle 500 is detected based on an audio recording, the location of the emergency vehicle 500 is determined using depth estimation from stereo camera or multiple monocular images captured by the perception system 116 or using sensor fusion with LIDAR and/or radar returns. In another example where the view becomes obstructed after the emergency vehicle 500 is detected in an image, the location of the emergency vehicle 500 can be determined based on a comparison of a time of arrival of sound within at least two audio recordings captured from different locations on the autonomous vehicle 200.

Once the location of the emergency vehicle 500 is determined in reference to the autonomous vehicle 200, the computing device 100 can send a command to one or more vehicle systems 118 to implement one or more maneuvers to comply with the traffic regulation if the location of the emergency vehicle 500 is such that the autonomous vehicle is required to comply. However, in the example of FIG. 5, the location of the emergency vehicle 500 is not proximate to the autonomous vehicle 200 and appears to be such that the emergency vehicle 500 will not cross the planned vehicle path of the autonomous vehicle 200, as the emergency vehicle 500 appears to be on a path to travel between an Eastern and Western branch of the intersection 502, neither of which crosses the planned vehicle path of the autonomous vehicle 200 currently located on a Northern branch and heading away from the intersection 502.

If the emergency vehicle 500 does travel between the Eastern and Western branch of the intersection 502, the autonomous vehicle 200 is not required to comply with the traffic regulation, and the autonomous vehicle 200 can continue along its planned vehicle path. The steps of detection and determination of the location of the emergency vehicle 500 are iterative such that any changes in the path of the emergency vehicle 500 would be detected in a sufficient time to allow the autonomous vehicle 200 to react accordingly. As described above, both the detection of and the determination of the location of the emergency vehicle 500 can be based on at least one of an audio recording and an image of the environment surrounding the autonomous vehicle 200.

Figure 6:
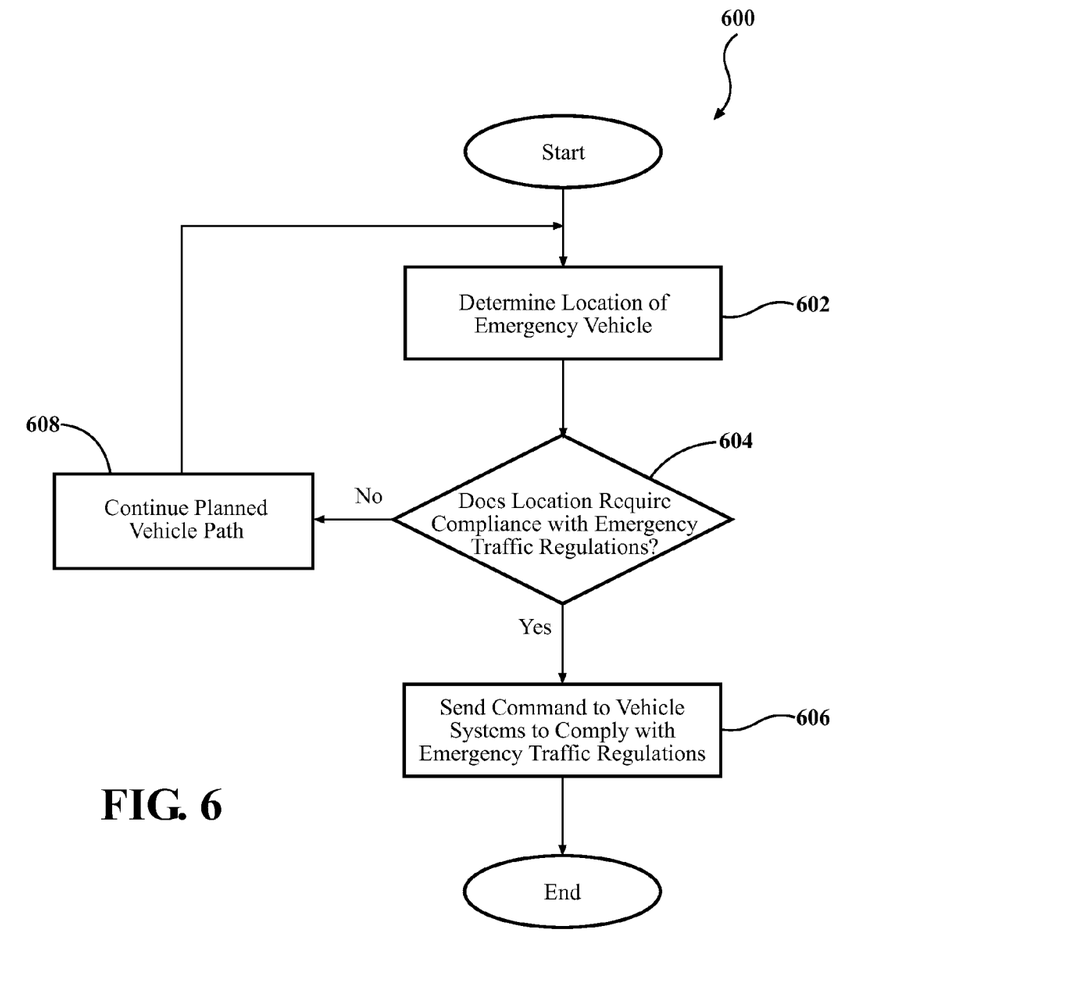
FIG. 6 is a logic flowchart of an emergency vehicle detection and response process performed by the automated driving system.

FIG. 6 is a logic flowchart of an emergency vehicle detection and response process 600 performed by the automated driving system of the autonomous vehicle 200. In step 602 of the process 600, the computing device 100 of the automated driving system can determine, based on information captured by the perception system 116, the location of an emergency vehicle operating in an emergency mode. For example, the emergency vehicles 300, 400, 500 described in FIGS. 3, 4, and 5 were first detected in either audio recordings or images captured by the perception system 116. Then, detection of the emergency mode was based on either sound matching of a siren within an audio recording or shape matching, text matching, or light pattern matching within a captured image. After detection of the emergency vehicle in the emergency mode, the location of the emergency vehicle can be determined based on at least one of the audio recording and the image captured.

For example, the locations of the emergency vehicles 300, 400, 500 described in FIGS. 3, 4, and 5 were determined based on the comparison of a time of arrival of sound within at least two captured audio recordings, sensor fusion with LIDAR and/or radar returns, or by using depth estimation from stereo camera or multiple monocular images captured by the perception system 116. Once the distance to and direction of the emergency vehicle is determined, the emergency vehicle can be placed on the same map used by the autonomous vehicle 200 for localization.

In decision tree 604 of the process 600, the automated driving system determines whether the location of the emergency vehicle is such that the autonomous vehicle 200 is required to comply with one or more traffic regulations. Determining whether the location of the emergency vehicle requires compliance with a traffic regulation can include determining whether the distance between the autonomous vehicle 200 and the emergency vehicle is below a predetermined threshold, i.e. whether the emergency vehicle is close enough to the autonomous vehicle 200 for the autonomous vehicle to be required to comply with the traffic regulation. Determining whether the location of the emergency vehicle requires compliance with the traffic regulation can also include analyzing the trajectory of the emergency vehicle and determining whether the emergency vehicle's trajectory will cross the planned vehicle path for the autonomous vehicle 200.

If the location of the emergency vehicle is such that the autonomous vehicle 200 is required to comply with the traffic regulation, the process 600 continues to step 606 where the computing device 100 sends a command to one or more of the vehicle systems 118 to implement one or more maneuvers to comply with the traffic regulation. Such maneuvers can include braking, steering, accelerating, etc. to bring the autonomous vehicle 200 to a location in compliance with the traffic regulation. After step 606, the process 600 can end. If the location of the emergency vehicle is such that the autonomous vehicle 200 is not required to comply with the traffic regulation, the process 600 continues to step 608 where the autonomous vehicle 200 continues along its current planned vehicle path. After step 608, the process 600 can begin a second iteration to again determine the location of the emergency vehicle in case the new location is such that compliance with the traffic regulation is now appropriate.

Figure 7:
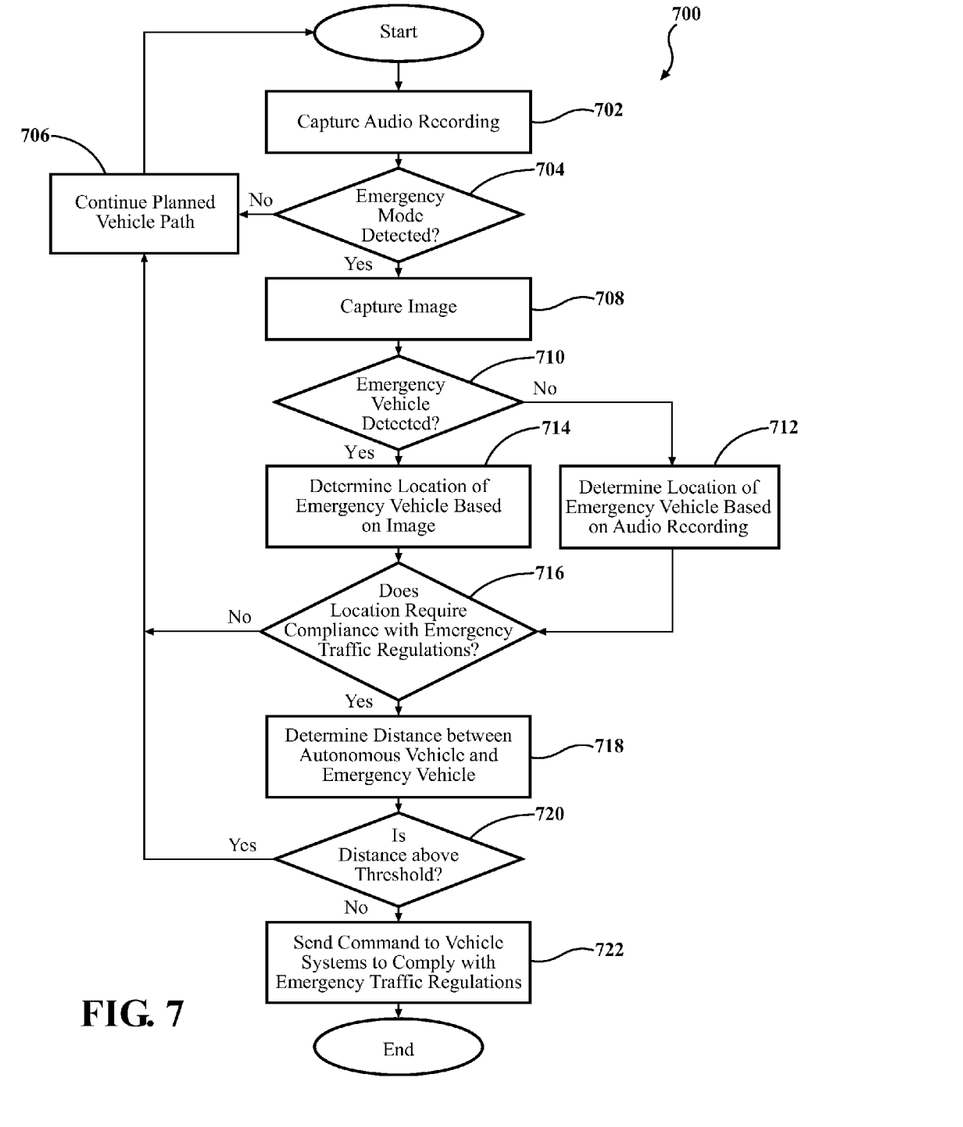
FIG. 7 is a logic flowchart of a more detailed emergency vehicle detection and response process performed by the automated driving system based on the process described in FIG. 6.

FIG. 7 is a logic flowchart of a more detailed emergency vehicle detection and response process 700 performed by the automated driving system of the autonomous vehicle 200 based on the process described in FIG. 6. In step 702 of the process 700, the automated driving system can capture an audio recording, for example, when one or more of the sensors 202 of the perception system 116 disposed on the autonomous vehicle 200 is a microphone. The process 700 can continue to decision block 704 where the automated driving system determines whether an emergency vehicle is operating in an emergency mode based on the audio recording captured by the perception system 116. Using an audio-based determination is beneficial, when as in the example shown in FIG. 4, the emergency vehicle 400 is obscured from view by foliage 402 located between the autonomous vehicle 200 and the emergency vehicle 400. As described previously, the detection of the emergency mode can be based on sound matching of a siren associated with the emergency vehicle within the audio recording captured by the perception system 116.

If the emergency vehicle is not determined to be operating in an emergency mode, the process 700 continues to step 706 where the autonomous vehicle 200 continues along the planned vehicle path, then the process 700 starts over. If the emergency vehicle is determined to be operating in an emergency mode, the process continues to step 708, where an image of the environment surrounding the autonomous vehicle 200 is captured using the perception system 116. The process 700 can then continue to decision block 710 where the automated driving system determines whether the emergency vehicle can be detected within the captured image. If the emergency vehicle cannot be detected within the captured image, the location of the emergency vehicle in respect to the autonomous vehicle 200 is determined using audio recordings in step 712. For example, the location of the emergency vehicle in respect to the autonomous vehicle 200 can be determined by comparing a time of arrival of sound within at least two audio recordings.

If the emergency vehicle can be detected within the captured image, the location of the emergency vehicle in respect to the autonomous vehicle 200 can be determined in step 714 using, for example, sensor fusion with LIDAR and/or radar returns or depth estimation from stereo camera or multiple monocular images. Whether the location of the emergency vehicle is determined in step 712 or step 714, the process 700 continues to decision block 716 where the automated driving system determines whether the location of the emergency vehicle requires compliance with one or more traffic regulations. For example, lane markings, lane dividers, and intersection structure identified within captured images can be used to determine if the position of the emergency vehicle requires compliance with the one or more traffic regulations.

If the location of the emergency vehicle in respect to the autonomous vehicle 200 is such that the autonomous vehicle 200 is not required to comply with any traffic regulations, the process continues to step 706 and the autonomous vehicle 200 continues along the planned vehicle path, and again, the process 700 starts over. This is shown, for example, in FIG. 5 where the autonomous vehicle 200 is traveling away from the intersection 502 while the emergency vehicle 500 is approaching the intersection 502 and the path of the emergency vehicle 500 will not cross the planned path of the autonomous vehicle 200.

If the location of the emergency vehicle in respect to the autonomous vehicle 200 is such that the autonomous vehicle 200 is required to comply with a traffic regulation, the process continues to step 718 and the automated driving system determines the distance between the autonomous vehicle 200 and the emergency vehicle. If images of the emergency vehicle are captured by the perception system 116, depth estimation can be used to determine distance. If only audio recordings of the siren of the emergency vehicle are captured by the perception system 116, decibel level of the siren can be used to determine distance. Once the distance between the autonomous vehicle 200 and the emergency vehicle is determined, the process 700 continues to decision block 720 where the automated driving system determines whether the distance is above a predetermined threshold. The distance threshold can be fixed, such as 400 m, or based on the specific details of the traffic regulation and jurisdiction in which the autonomous vehicle 200 is operating.

If the distance is above the predetermined threshold, the process 700 continues to step 706 and the autonomous vehicle 200 continues along the planned vehicle path, and again, the process 700 starts over. If the distance is below the predetermined threshold, the process 700 continues to step 722 and the automated driving system sends a command to one or more vehicle systems 118 of the autonomous vehicle 200 to implement one or more maneuvers, such as steering, braking, accelerating, etc. to comply with the traffic regulation. After step 722, the process 700 ends.

Figure 8:
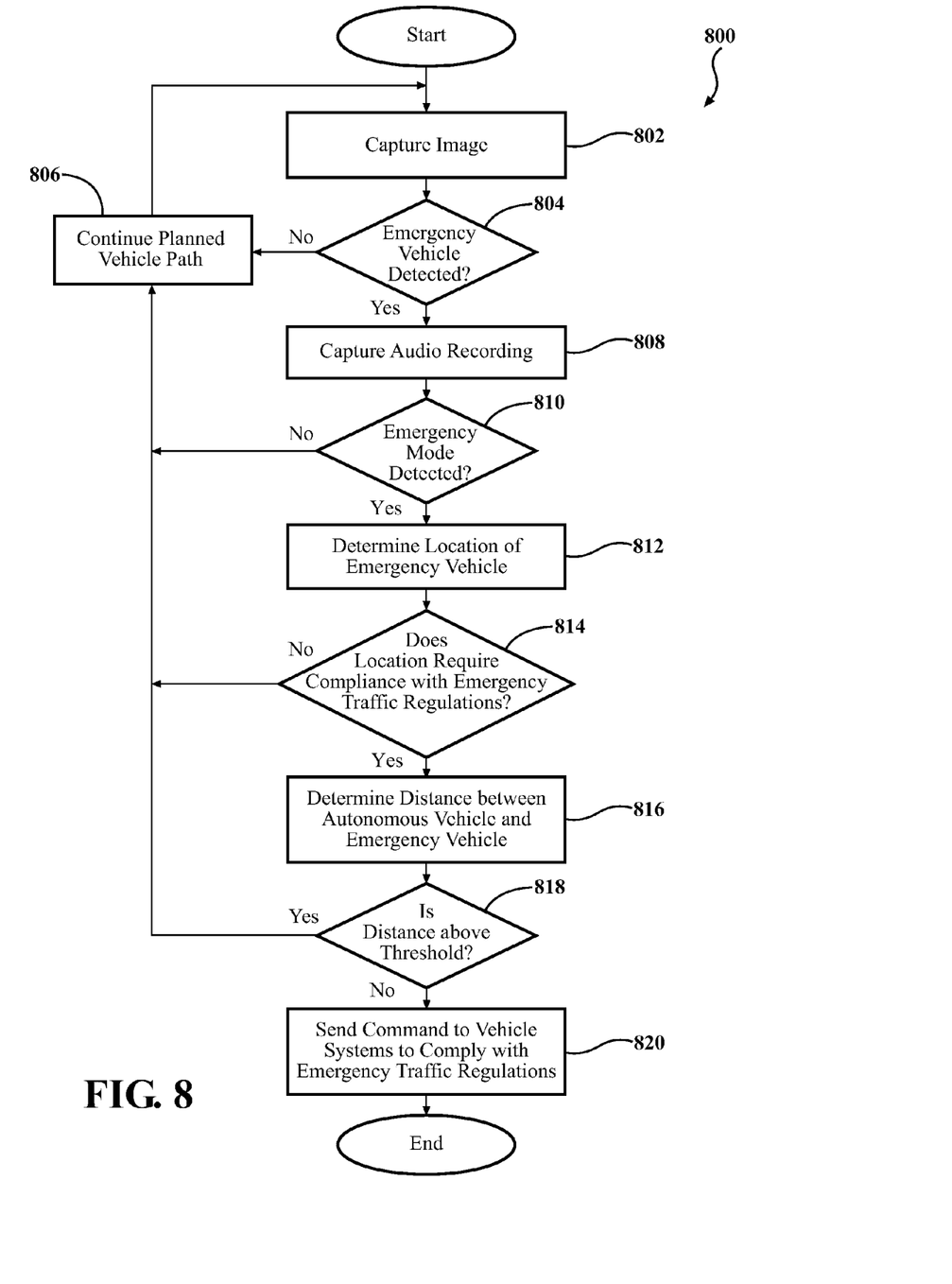
FIG. 8 is a logic flowchart of another more detailed emergency vehicle detection and response process performed by the automated driving system based on the process described in FIG. 6.

FIG. 8 is a logic flowchart of another more detailed emergency vehicle detection and response process 800 performed by the automated driving system of the autonomous vehicle 200 based on the process described in FIG. 6. In step 802 of the process 800, the automated driving system can capture an image of the environment surrounding the autonomous vehicle 200, for example, when one or more of the sensors 202 of the perception system 116 disposed on the autonomous vehicle 200 is a camera. The process 800 can continue to decision block 804 where the automated driving system determines whether an emergency vehicle is detected within the captured image. As previously described, the emergency vehicle can be detected within the image using shape matching, text matching, or light pattern matching. If an emergency vehicle is not detected within the captured image, the process 800 can continue to step 806 where the autonomous vehicle 200 continues along the planned vehicle path, then the process 800 starts over.

If an emergency vehicle is detected within the captured image, the process 800 continues to step 808, where an audio recording is captured using the perception system 116. The process 800 can continue to decision block 810 where the automated driving system determines whether the detected emergency vehicle is operating in an emergency mode based on the audio recording, for example, by detecting a siren associated with the emergency vehicle. If the detected emergency vehicle is not operating in an emergency mode, the process 800 can continue to step 806 where the autonomous vehicle 200 continues along the planned vehicle path, and again, the process 800 starts over.

If the detected emergency vehicle is operating in an emergency mode, the process 800 continues to step 812 where the automated driving system determines the location of the emergency vehicle. Since the emergency vehicle was initially detected within an image in process 800, a tracking system can be used to locate the position of the emergency vehicle in reference to the autonomous vehicle 200 using, for example, sensor fusion with LIDAR and/or radar returns or depth estimation using stereo camera or multiple monocular images.

Once the location of the emergency vehicle operating in the emergency mode is determined, the process 800 can continue to decision block 814 where the automated driving system determines whether the location of the emergency vehicle requires compliance with one or more traffic regulations. If the location of the emergency vehicle in respect to the autonomous vehicle 200 is such that the autonomous vehicle 200 is not required to comply with any traffic regulations, the process continues to step 806 and the autonomous vehicle 200 continues along the planned vehicle path, and again, the process 800 starts over.

If the location of the emergency vehicle in respect to the autonomous vehicle 200 is such that the autonomous vehicle 200 is required to comply with a traffic regulation, the process continues to step 816 and the automated driving system determines the distance between the autonomous vehicle 200 and the emergency vehicle. As described previously, the distance can be estimated based on the difference between the location of the emergency vehicle and the autonomous vehicle 200. Once the distance between the autonomous vehicle 200 and the emergency vehicle is determined, the process 800 continues to decision block 818 where the automated driving system determines whether the distance is above a predetermined threshold. As described above, the distance threshold can be fixed, for example, 400 m or 800 m, or based on the specific details of the traffic regulation and jurisdiction in which the autonomous vehicle 200 is operating.

If the distance is above the predetermined threshold, the process 800 continues to step 806 and the autonomous vehicle 200 continues along the planned vehicle path, and again, the process 800 starts over. If the distance is below the predetermined threshold, the process 800 continues to step 820 where the automated driving system sends a command to one or more vehicle systems 118 of the autonomous vehicle 200 to implement one or more maneuvers, such as steering, braking, accelerating, etc. to comply with the traffic regulation. After step 820, the process 800 ends.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. The scope of the claims is to be accorded the broadest interpretation so as to encompass all such modifications and equivalent structures as is permitted under the law.

What is claimed is:

1. An automated driving system, comprising:
a perception system disposed on an autonomous vehicle; and
a computing device in communication with the perception system, comprising:
one or more processors for controlling operations of the computing device; and
a memory for storing data and program instructions used by the one or more processors, wherein the one or more processors are configured to execute instructions stored in the memory to:
detect, based on at least two audio recordings captured by the perception system, an emergency vehicle operating in an emergency mode, wherein each audio recording is captured at a different location on the autonomous vehicle;

after detection, capture, using the perception system, an image of an environment surrounding the autonomous vehicle;

determine a location of the emergency vehicle in respect to the autonomous vehicle based on a comparison of a time of arrival of sound within each of the at least two audio recordings; and if the location of the emergency vehicle is such that the autonomous vehicle is required to comply with a traffic regulation, send a command to one or more vehicle systems of the autonomous vehicle to implement one or more maneuvers to comply with the traffic regulation.

2. The automated driving system of claim 1, wherein detection of the emergency vehicle operating in the emergency mode is based on at least sound matching of a siren associated with the emergency vehicle within the audio recording captured by the perception system.

3. The automated driving system of claim 1, wherein determination of the location of the emergency vehicle in respect to the autonomous vehicle is based on at least one of sensor fusion from LIDAR returns and sensor fusion from radar returns and depth estimation from stereo camera images and depth estimation from multiple monocular images captured by the perception system.

4. The automated driving system of claim 1, wherein the processor is further configured to:
if the location of the emergency vehicle is such that the autonomous vehicle is not required to comply with the traffic regulation, continue a planned vehicle path.

5. The automated driving system of claim 1, wherein the one or more processors are further configured to:
determine a distance between the autonomous vehicle and the emergency vehicle.

6. The automated driving system of claim 5, wherein sending the command to the one or more vehicle systems of the autonomous vehicle to implement the one or more maneuvers to comply with the traffic regulation is further based on the distance between the autonomous vehicle and the emergency vehicle being below a predetermined threshold.

7. The automated driving system of claim 5, wherein determination of the distance between the emergency vehicle and the autonomous vehicle is based on at least one of a decibel level of a siren associated with the emergency vehicle within the audio recording captured by the perception system and shape matching within the image captured by the perception system.

8. The automated driving system of claim 5, wherein the one or more processors are further configured to:
if the distance between the autonomous vehicle and the emergency vehicle is above a predetermined threshold, continue a planned vehicle path.

9. A computer-implemented method of automated driving, comprising:
detecting, based on an image captured by a perception system disposed on an autonomous vehicle, an emergency vehicle;
after detecting the emergency vehicle, determining, based on at least two audio recordings captured by the perception system, whether the emergency vehicle is operating in an emergency mode, wherein each audio recording is captured at a different location on the autonomous vehicle;
if the emergency vehicle is operating in the emergency mode, determining a location of the emergency vehicle in respect to the autonomous vehicle based on a comparison of a time of arrival of sound within each of the at least two audio recordings; and
if the location of the emergency vehicle is such that the autonomous vehicle is required to comply with a traffic regulation, sending a command to one or more vehicle systems of the autonomous vehicle to implement one or more maneuvers to comply with the traffic regulation.

10. The method of claim 9, wherein detecting the emergency vehicle is based on at least one of shape matching, text matching, and light pattern matching within the image captured by the perception system.

11. The method of claim 9, wherein determining whether the emergency vehicle is operating in the emergency mode is based on detecting a siren associated with the emergency vehicle in the audio recording captured by the perception system.

12. The method of claim 9, wherein determining the location of the emergency vehicle in respect to the autonomous vehicle is based on at least one of sensor fusion from LIDAR returns and sensor fusion from radar returns and depth estimation from stereo camera images and depth estimation from multiple monocular images captured by the perception system.

13. The method of claim 9, further comprising:
if the location of the emergency vehicle is such that the autonomous vehicle is not required to comply with the traffic regulation, continuing a planned vehicle path.

14. The method of claim 9, further comprising:
determining a distance between the autonomous vehicle and the emergency vehicle.

15. The method of claim 14, wherein sending the command to the one or more vehicle systems of the autonomous vehicle to implement the one or more maneuvers to comply with the traffic regulation is further based on the distance between the autonomous vehicle and the emergency vehicle being below a predetermined threshold.

16. The method of claim 14, wherein determining the distance between the emergency vehicle and the autonomous vehicle is based on at least one of a decibel level of a siren associated with the emergency vehicle within the audio recording captured by the perception system and shape matching within the image captured by the perception system.

17. The method of claim 14, further comprising:
if the distance between the autonomous vehicle and the emergency vehicle is above a predetermined threshold, continuing a planned vehicle path.

18. A computing device, comprising:
one or more processors for controlling operations of the computing device; and
a memory for storing data and program instructions used by the one or more processors, wherein the one or more processors are configured to execute instructions stored in the memory to:
determine, using a perception system disposed on an autonomous vehicle, a location of an emergency vehicle operating in an emergency mode based on at least two audio recordings captured by the perception system with each audio recording captured at a different location on the autonomous vehicle, where the location of the emergency vehicle is determined in respect to the autonomous vehicle based on a comparison of a time of arrival of sound within each of the at least two audio recordings; and
if the location of the emergency vehicle is such that the autonomous vehicle is required to comply with a traffic regulation, send a command to one or more vehicle systems of the autonomous vehicle to implement one or more maneuvers to comply with the traffic regulation.

\* \* \* \* \*